(12) United States Patent
Gralnick

(10) Patent No.: US 9,898,553 B2
(45) Date of Patent: Feb. 20, 2018

(54) CAPTURING RUN-TIME METADATA

(71) Applicant: JPMorgan Chase Bank, N.A., New York, NY (US)

(72) Inventor: Samuel Gralnick, Cold Spring, NY (US)

(73) Assignee: JPMorgan Chase Bank, N.A., New York, NY (US)

( * ) Notice: Subject to any disclaimer, the term of this patent is extended or adjusted under 35 U.S.C. 154(b) by 298 days.

(21) Appl. No.: 14/790,166

(22) Filed: Jul. 2, 2015

(65) Prior Publication Data

US 2016/0012153 A1 Jan. 14, 2016

Related U.S. Application Data

(60) Provisional application No. 62/022,186, filed on Jul. 8, 2014.

(51) Int. Cl.
*G06F 17/30* (2006.01)
(52) U.S. Cl.
CPC .............................. *G06F 17/30958* (2013.01)
(58) Field of Classification Search
CPC ............... G06F 17/30; G06F 17/30637; G06F 17/30481; G06F 17/30663; G06F 17/30958

USPC .................................................. 707/600–899
See application file for complete search history.

(56) References Cited

U.S. PATENT DOCUMENTS

2014/0149446 A1* 5/2014 Kuchmann-Beauger ............ G06F 17/30389
707/763

* cited by examiner

*Primary Examiner* — Isaac M Woo
(74) *Attorney, Agent, or Firm* — LeClairRyan, a Professional Corporation

(57) ABSTRACT

A processor captures, during the run-time of a first event, run-time metadata associated with the first event, the run-time metadata comprising a data lineage and a data provenance. The data lineage identifies input data existing before the first event and resulting data of the first event. The data provenance identifies an agent executing the first event. The processor then generates a property graph with the property graph comprising a plurality of nodes. The plurality of nodes comprises a first node, a second node, and a third node. The first node comprises an identification of the input data existing before the first event. The second node comprises an identification of the agent executing the first event, and the second node is coupled to the first node. The third node comprises an identification of the resulting data of the first event, and the third node is coupled to the second node.

17 Claims, 5 Drawing Sheets

CAPTURING RUN-TIME METADATA

RELATED APPLICATIONS

This application claims priority under 35 U.S.C. § 119 to U.S. Provisional Patent Application Ser. No. 62/022,186, entitled "CAPTURING RUN TIME METADATA," which was filed on Jul. 8, 2014. U.S. Provisional Patent Application Ser. No. 62/022,186 is hereby incorporated by reference.

TECHNICAL FIELD

This invention relates generally to capturing run-time metadata, and more particularly to capturing run-time metadata and generating a property graph from the captured run-time metadata.

BACKGROUND

When substantiating generated data, systems may attempt to generate metadata before the data has been generated. Typically, systems attempt to examine existing code and design documentation to capture this metadata. In addition to being time-consuming, inefficient, and costly, capturing metadata before the data has been generated fails to capture run-time metadata, the actual provenance and lineage of the generated data. Furthermore, as a matter of first principle, systems are not able to successfully reflect the provenance and lineage of the generated data when the existing code contains conditional logic.

SUMMARY OF EXAMPLE EMBODIMENTS

According to embodiments of the present disclosure, disadvantages and problems associated with capturing run-time metadata and generating a property graph may be reduced or eliminated.

In accordance with a particular embodiment of the present disclosure, a processor captures, during the run-time of a first event, run-time metadata associated with the first event, the run-time metadata comprising a data lineage and a data provenance. The data lineage identifies input data existing before the first event and resulting data of the first event. The data provenance identifies an agent executing the first event. The processor then generates a property graph with the property graph comprising a plurality of nodes. The plurality of nodes comprises a first node, a second node, and a third node. The first node comprises an identification of the input data existing before the first event. The second node comprises an identification of the agent executing the first event, and the second node is coupled to the first node. The third node comprises an identification of the resulting data of the first event, and the third node is coupled to the second node.

Certain embodiments of the present disclosure may provide one or more technical advantages. A technical advantage of one embodiment includes the ability to capture run-time metadata, which includes both data provenance and data lineage. As another example, a technical advantage of one embodiment is to recognize the various underlying relationships between the captured run-time metadata. In addition, another technical advantage of one embodiment includes recognizing the various graphical representations of the metadata relationships and displaying the graphical representations as a property graph. Furthermore, another technical advantage of one embodiment includes greater efficiencies in execution time, independent of the depth of the graph traversed, due to the metadata processing and storage. As yet another example, a technical advantage of one embodiment includes greater visibility into the relationships and events that generate data. Furthermore, using the property graph, users may: (1) quickly verify results of a report for report attestation; (2) resolve data quality issues by efficiently locating sources of error; (3) validate test results by comparing pre-release to post-release results and understanding the differences between the results; and (4) analyzing data sources and usage to create an impact assessment for a proposed change.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and for further features and advantages thereof, reference is now made to the following description taken in conjunction with the accompanying drawings, in which.

DETAILED DESCRIPTION

Embodiments of the present invention and its advantages are best understood by referring to FIGS. 1-6, like numerals being used for like and corresponding parts of the various drawings.

When substantiating generated data, systems may attempt to generate metadata before the data has been generated. Typically, systems attempt to examine existing code and design documentation to capture this metadata. In addition to being time-consuming, inefficient, and costly, capturing metadata before the data has been generated fails to capture run-time metadata, the actual provenance and lineage of the generated data. Furthermore, as a matter of first principle, systems are not able to successfully reflect the provenance and lineage of the generated data when the existing code contains conditional logic. Run-time metadata, however, provides a timely record of information associated with a past execution or current execution of an event. This record of information can successfully reflect the provenance and lineage of the generated data.

The teachings of this disclosure recognize that it would be desirable to provide a system that captures run-time metadata associated with an event. Furthermore, the teachings of this disclosure recognize that it would be desirable to also capture the underlying relationships between the events and metadata associated with the events. The teachings of this disclosure further recognize that it would be desirable to visually depict the event, associated metadata, and relationships as a property graph. This leads to greater visibility into the relationships and events that lead to generated data. Furthermore, using the property graph, users may: (1)

quickly verify results of a report for report attestation; (2) resolve data quality issues by efficiently locating sources of error; (3) validate test results by comparing pre-release to post-release results and understanding the differences between the results; and (4) analyzing data sources and usage to create an impact assessment for a proposed change.

Figure 1:
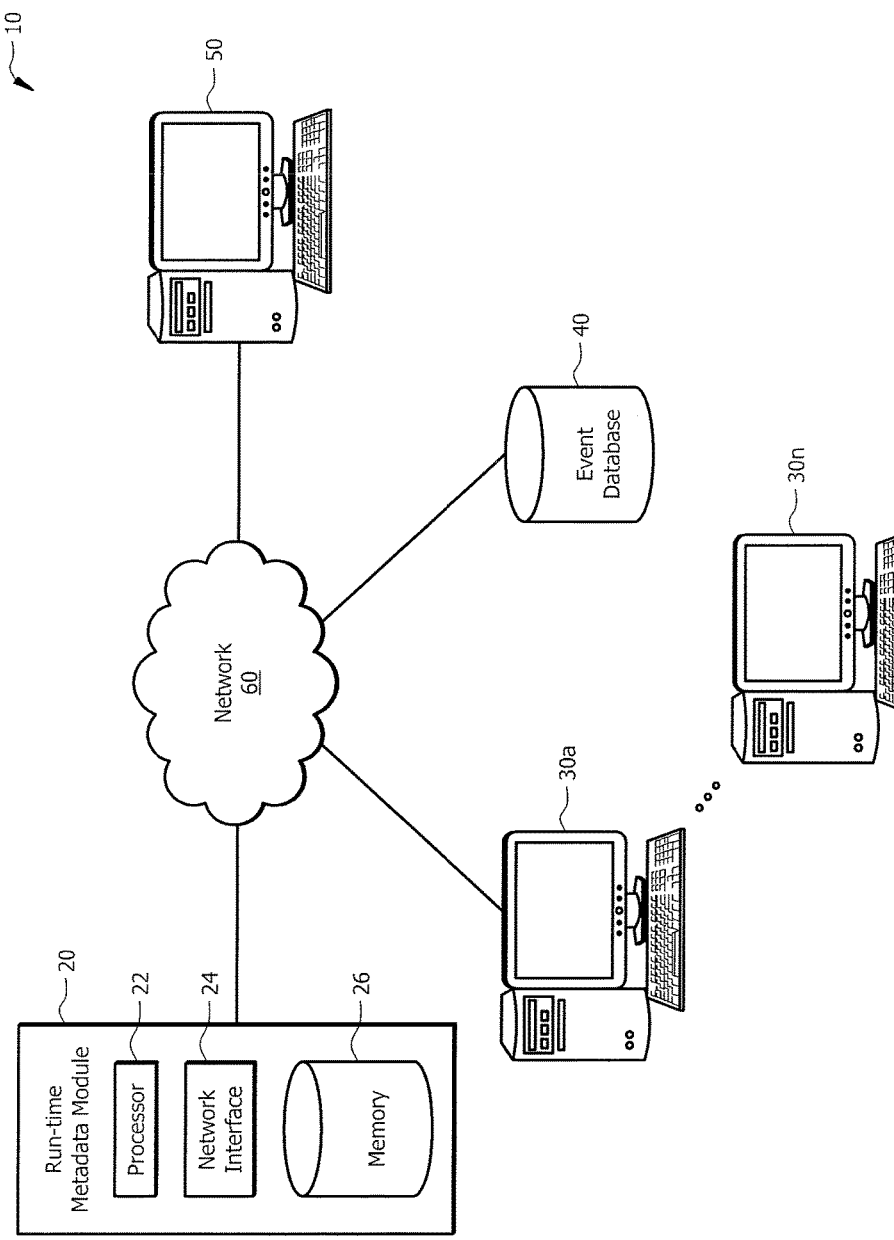
FIG. 1 illustrates a system for capturing run-time metadata and generating a property graph.

FIG. 1 illustrates a system for capturing run-time metadata and generating a property graph. More specifically, system 10 includes run-time metadata module 20, event computers 30a-30n, event database 40, property graph computer 50, and network 60. Generally, run-time metadata module 20, event computers 30a-30n, event database 40, and property graph computer 50 interact to efficiently capture run-time metadata and generate a property graph. An example property graph is described below with reference to FIG. 4 and FIG. 5.

System 10 includes run-time metadata module 20. Run-time metadata module 20 represents any suitable component that facilities the capturing of run-time metadata associated with an event, processing the captured run-time metadata into a linked-list data structure, and generating a property graph using the captured run-time metadata.

In an exemplary embodiment of operation, run-time metadata module 20 captures run-time metadata associated with an event. An event may be any type of action or calculation that generates, views, updates, alters, or deletes information associated with system 10. For example, event computer 30 may generate an event by starting an action to generate a report. As another example, event database 40 may create an event by performing calculations on data existing in event database 40. As an additional example, a third party source may generate data and transfer the data to a component in system 10.

Each event can have associated metadata. Metadata, in general, is a form of data that describes other data. Metadata contains basic information about a specific data. As an example, document metadata may include author, data created, date modified, and file size. Metadata can be generated manually or by automated information processing. There are several types of metadata, including, but not limited to: design-time metadata and run-time metadata. Example use cases of metadata are described below with reference to FIG. 2. To aid in the description, the following terms and terminology will be used:

Agent: An agent may be a person or an organization controlling a process execution or a service or software tool that performed the execution. Generally, an agent is an entity that acts as a catalyst to enable, facilitate, controller, or affect the execution of a process.

Artifact: An artifact represents an immutable piece of state, which may have a physical embodiment in a physical object or a digital representation in a computer system. For example, an artifact may be a data object generated by an agent on event computer 30 after the agent decides to generate a report.

Process: A process may be an action or series of actions performed on or caused by artifacts, which my result in new artifacts. In the previous example, the generation of the report is the process.

One form of metadata is design-time metadata. Design-time metadata may specify the agents, artifacts, and processes to identify the system's intended interactions with a set or sets of data in order to produce a required result. Examples of design-time metadata include Unified Modeling Language (UML) diagrams, Context Diagrams that show data flows between components, Entity-Relationship (ER) diagrams, Business Requirements, and Technical Specifications.

In certain embodiments, run-time metadata module 20 extracts design facts from the design-time metadata and stores it in memory 36. Design facts are semantic relationships representing all aspects of a design (e.g., the agents, artifacts, and processes used to produce a required result) in a form suitable for direct query and analysis. In certain instances, code harvesting may be used to extract design facts from the design-time metadata. Code harvesting may consist of harvesting information by analyzing design documentation and existing code. Generally, code harvesting is only used if harvesters exist for the code language in use and if adequate design process documentation is not available or not adequate.

Another form of metadata is run-time metadata. Run-time metadata may include a record of information associated with a past execution or current execution of an event. In exemplary embodiments, run-time metadata is captured during the run-time of an event. The run-time of an event begins as an event starts and ends when the event is completed. For example, in a report generation event on event computer 30, the event may start when an agent requests running a report generation application, the event may continue when the report generation application inputs stored data that existed before the event, and the event may finish when it creates a resulting data of the event (e.g., a report in this case). Run-time metadata module 20 may capture two types of run-time metadata: data provenance and data lineage. Examples of data provenance and data lineage in run-time metadata are described below with reference to FIG. 3.

Data provenance may document the inputs, entities, systems, processes, or any type of properties of attributes that influence the data of interest. In certain instances, data provenance may be generated by a code capture that runs during artifact creation events, artifact consumption events, artifact archiving events, artifact destruction events, and/or artifact update events. In artifact creation events, the code capture may capture what artifact was created, when the artifact was created, and how it was created. In artifact consumption events, the code capture may capture a record of the artifact consumption, when the artifact was consumed, and what component consumed the artifact. In the artifact archiving events, the code capture may capture the data artifact residency changes, such as where was the artifact moved from, where the artifact moved to, and the identification of the actor requesting the archiving. In the artifact updating event, the code capture may capture a record of what artifact was updated, when the artifact was updated, and how the artifact was updated. In certain embodiments, the data provenance identifies an agent executing an event. In an exemplary embodiment, run-time metadata module 20 captures the data provenance during the runtime of the event.

Data lineage, on the other hand, is a data's lifecycle and where it was consumed to produce a result. Data lineage identifies where specified data comes from and how it has been transformed to its present state. In certain embodiments, data lineage identifies input data existing before an event occurs and also the resulting data of an event. Input data existing before an event occurs may be data that is consumed by an event to produce a result. The resulting data of an event may include the byproduct of the execution of the event. For example, in a report generation event, an application uses stored data (i.e., data existing before the event occurs) to create a report (i.e., the resulting data of the event).

Run-time data, including data lineage and data provenance, may be captured by run-time metadata module 20 in a myriad of ways. In one embodiment, run-time metadata module 20 runs a clickstream capture on event computer 30 to identify events occurring on event computer 30. A clickstream capture represents a recording of a user's mouse clicks and/or keyboard entries when initiating or using an application. The clicks or keyboard entries are then communicated to run-time metadata module 20. In another embodiment, event computer 30 and/or event database 40 notifies run-time metadata module 20 of an event occurring. Run-time metadata module 20 may then capture run-time metadata after receiving notification that an event is occurring. In an additional embodiment, event computer 30 and/or event database 40 may capture run-time metadata from an event and communicate the run-time metadata to event run-time metadata module 30.

This disclosure contemplates a myriad of ways to limit the amount of metadata captured. Run-time metadata module 20 may restrict the capture of metadata to a certain type of metadata. As an example, run-time metadata module 20 may capture only provenance and lineage metadata. Run-time metadata module 20 may also restrict capturing metadata to events within a specified scope. For instance, if the specified scope is set to a specific report, the run-time metadata module 20 may restrict capturing metadata to only events pertaining to developing that specific report. Furthermore, the granularity of metadata captured can be adjusted. An increased level of granularity means more retained relationships, events, and/or associated metadata captured. A decreased level of granularity means less metadata may be captured with an event, fewer events may be captured, and/or fewer relationships between the various events may be captured. Run-time metadata module 20 may prioritize and rank events, metadata, and relationships to determine which events, metadata, and relationships may be retained or removed based on the change in granularity.

Run-time metadata module 20 may identify relationships between events using a linked-list data structure with pointers connecting the various events. For example, run-time metadata module 20 may capture data lineage when event computer 30 communicates an artifact to event database 40. As another example, run-time metadata module 20 may capture the user of event computer 30 starting a process to generate a report. In this example, data lineage may include linking the starting state of the data before generating the report to the finalized state of the data after the report is generated.

Run-time metadata module 20 may format run-time metadata to a linked-list data structure. A linked-list data structure includes of a group of nodes that together represent a sequence. Generally, each node includes a set of data and a link to the next node or nodes in the sequence. In a particular embodiment, each node represents an event, agent, artifact, or process with the data in the node comprising various attributes, properties, and descriptions of the node. In addition, the link in the linked-list data structure identifies the connections between the event, agent, artifact, and/or process represented by the node. In certain embodiments, run-time metadata module 20 formats the run-time metadata to a double linked-list structure. In a double linked-list structure, each node points to the next node in sequence but also points to the previous node in the sequence. This provides for efficient tracing of nodes. In exemplary embodiments, the linked-list structure allows a node to be connected to multiple nodes and a node to receive connections from multiple nodes.

Run-time metadata module 20 may generate a property graph using the run-time metadata. A property graph is a visual depiction of modeling relationships through nodes and connections. Each event, agent, artifact, and/or process is represented by a node, and each connection represents a connection between two or more events, agents, artifacts, and/or processes. In certain instances, run-time metadata module 20 uses the pointers contained in the linked-list data structure to determine the connections between nodes. Each node may contain properties describing that event, agent, artifact, and/or process. In addition, each connection may contain a definition of the connection. For instance, if a report generation application generates a report, report generation application node and the generated report node may be connected with the description of the connection comprising "creates new." In this instance, a user of the property graph can understand that the report generation application created a new report.

The layout of the property graph may be customizable in order to provide an easily viewable format for property graph computer 50. For example, the graph may be arranged along a time line that represents the time of the events in order to show the progression of the data creation over time.

Typically, when property graph computer 50 displays the property graph, several pieces of information may become apparent. For instance, the property graph may display the data provenance. In certain embodiments, property graph computer 50 may query the data provenance of a node across time, entity, or other parameters that a user may want to research further. For example, a user may identify what trades were booked by a particular desk in the last thirty days. As another example, the property graph may display a data lineage. In certain embodiments, the data lineage provides information regarding what data was consumed by an event and what resulting data came from the event. In addition, the property graph may also display the data consumption and production of each node and/or connection. The data consumption and production of each node and connection may help answer questions such as: what data does each component or service consume or what data does each component or service produce.

In certain embodiments, the property graph comprises a plurality of nodes. The nodes may identify agents, artifacts, and/or processes related to a certain event or the event itself. For example, run-time metadata associated with an event may comprise data lineage identifying an input data existing before the event and also a resulting data of the event. The run-time metadata may also comprise data provenance that identifies an agent executing the event. Using this metadata, run-time metadata module 30 may then generate a property graph comprising a plurality of connected nodes. Specifically, the plurality of nodes may comprise a first node, a second node, and a third node. The first node may comprise an identification of the input data existing before the event (as specified by the data lineage). The second node may comprise an identification of the agent executing the event (as specified by the data provenance). The third node may comprise an identification of the resulting data of the event (as specified by the data lineage). In this example, the first node is graphically coupled to the second node, and the second node is graphically coupled to the third node. Furthermore, each node may contain a node descriptor identifying the action related to the event, the individual controlling the event, and the location of the event. Each connection between the nodes may contain a connector descriptor. For example, the connection descriptor may identify an action associated with the event.

In certain instances, run-time metadata module 20 may further capture a second run-time metadata associated with a second event. The second run-time metadata may further include a second data lineage that indicates that the input data for the second event is the result of the first event. In addition, the second run-time metadata may further include a second data provenance that identifies a second agent executing the second event. Using this second run-time metadata, run-time metadata module 20 may modify the existing property graph such that a fourth node exists. The fourth node may identify the second agent executing the second event, and may be connected to the third node. Looking at this example property graph on property graph computer 50, a user may quickly identify that the second event is related to the first event because the second event used the resulting data of the first event.

Run-time metadata module 20 may then display the property graph on property graph computer 50. In certain embodiments, run-time metadata module 20 communicates the property graph to property graph computer 50 to display on its graphical user interface ("GUI"). In other embodiments, the property graph may be cloud-based. By placing the property graph on the cloud (i.e., hosting the property graph on a hosted service over the Internet), various property graph computers 40 may simultaneously view and interact with the property graph. The user of property graph computer 50 may interact with the property graph to further identify information of a particular node in the connection. Examples of benefits that users can have by using the generated property graph include: (1) attesting the accuracy of reports (for example, reports submitted to regulators and other government authorities); (2) addressing data quality issues; (3) validating test results; and (4) assisting in signing off on user acceptance testing; and (5) analyzing data sources and usage to create an impact assessment for a proposed change.

In the illustrated embodiment, run-time metadata module 20 includes processor 22, network interface 24, and memory 26. Processor 22 controls the operation and administration of run-time metadata module 20 by processing information received from network interface 24, and memory 26. Processor 22 communicatively couples to network interface 24, and memory 26. Processor 22 includes any hardware and/or software that operates to control and process information. For example, processor 22 controls the operation of run-time metadata module 20. Processor 22 may be a programmable logic device, a microcontroller, a microprocessor, any suitable processing device, or any suitable combination of the preceding.

Network interface 24 represents any suitable device operable to receive information from network 60, transmit information through network 60, perform suitable processing of the information, communicate to other devices, or any combination of the preceding. For example, network interface 24 receives run-time metadata from event computers 30a-30n or event database 40, and communicates a property graph to property graph computer 50. Network interface 24 represents any port or connection, real or virtual, including any suitable hardware and/or software, including protocol conversion and data processing capabilities, to communicate through network 60 or other communication system that allows run-time metadata module 20 to exchange information with event computers 30a-30n, event database 40, property graph computer 50, and other components of system 10.

Memory 26 represents a database that stores, either permanently or temporarily, operational software, or other information for processor 22. For example, memory 26 stores captured run-time metadata. In an exemplary embodiment, memory 26 stores the captured run-time metadata as a graph consisting of nodes, such as a linked-list data structure. In certain embodiments, processor 22 may query memory 26 using table functions and/or Structured Query Language (SQL) queries to return data lineage and data provenance for an event, agent, artifact, and/or process. Memory 26 includes any one or a combination of volatile or non-volatile local or remote devices suitable for storing information. For example, memory 26 may include RAM, ROM, magnetic storage devices, optical storage devices, or any other suitable information storage device or a combination of these devices. Memory 26 may include any suitable information for use in the operation of run-time metadata module 20. Additionally, memory 26 may be a component external to run-time metadata module 20. Memory 26 can be located in run-time metadata module 20 or any other location suitable for memory 26 to communicate with run-time metadata module 20.

System 10 also includes event computers 30a-30n, where n represents any suitable number, that communicates with run-time metadata module 20. Typically, event computer 30 causes an event to occur. For example, a user may select "generate report" on event computer 30 to initiate the generation of a report. In this example, run-time metadata module 20 may capture run-time metadata associated with the generation of a report. In certain embodiments, event computer 30 communicates the run-time metadata to run-time metadata module 20.

Event computer 30 may be implemented using any suitable type of processing system and may include any suitable combination of hardware, firmware, and software. Event computer 30 may include one or more computer systems at one or more locations. Each computer system may include any appropriate input devices, output devices, mass storage media, processors, memory, or other suitable components for receiving, processing, storing, and communicating data. For example, each computer system 30 may include a personal computer, workstation, network computer, kiosk, wireless data port, personal data assistant (PDA), one or more Internet Protocol (IP) telephones, smart phones, table computers, one or more servers, a server pool, one or more processors within these or other devices, or any other suitable processing device capable of receiving, processing, storing, and/or communicating information with other components of system 10. Event computer 30 may be a stand-alone computer or may be a part of a larger network of computers associated with an entity.

Event computer 30 may include a display, which may include any suitable device operable to visually present information to a user. The display may present a GUI, which may comprise a visual interface operable to allow a user to interface with event computer 30. Generally, the GUI provides the user with an efficient and user-friendly presentation of data provided by system 10, such as charts, tables and other information. The GUI may comprise a plurality of displays having interactive fields, pull-down lists, and buttons operated by the user. In one example, the GUI presents multiple charts and tables according to specification by the user and receives commands from the user. It should be understood that the term graphical user interface may be used in the singular or in the plural to describe one or more graphical user interfaces and each of the displays of a particular graphical user interface. Further, the GUI contemplates any graphical user interface, such as a generic web browser, that processes information in system 10 and efficiently presents the information to the user. Computer system 30 can accept data from the user via the web browser (e.g., MICROSOFT INTERNET EXPLORER, GOOGLE CHROME, or MOZILLA FIREFOX) and return the appropriate HTML or eXtensible Markup Language (XML) responses.

Event database 40 is another component in system 10 that may initiate an event. For example, event database 40 may perform calculations on a set of data stored in event database 40. Run-time metadata module 20 may capture the run-time metadata associated with the calculations performed in event database 40. Event database 40 includes any one or a combination of volatile or non-volatile local or remote devices suitable for storing information. For example, event database 40 may include RAM, ROM, magnetic storage devices, optical storage devices, or any other suitable information storage device or a combination of these devices.

System 10 may also include property graph computer 50. Property graph computer 50 may display a property graph generated by run-time metadata module 20. Property graph computer 50 may be implemented using any suitable type of processing system and may include any suitable combination of hardware, firmware, and software. Property graph computer 50 may include one or more computer systems at one or more locations. Each computer system may include any appropriate input devices, output devices, mass storage media, processors, memory, or other suitable components for receiving, processing, storing, and communicating data. For example, each property graph computer 50 may include a personal computer, workstation, network computer, kiosk, wireless data port, PDA, one or more IP telephones, smart phones, table computers, one or more servers, a server pool, one or more processors within these or other devices, or any other suitable processing device capable of receiving, processing, storing, and/or communicating information with other components of system 10. Property graph computer 50 may be a stand-alone computer or may be a part of a larger network of computers associated with an entity.

Property graph computer 50 may include a display, which may include any suitable device operable to visually present information to a user. The display may present a GUI, which may comprise a visual interface operable to allow a user to interface with Property graph computer 50. For example, the property graph generated by run-time metadata module 20 may be presented on the GUI. Generally, the GUI provides the user with an efficient and user-friendly presentation of data provided by system 10, such as charts, tables and other information. The GUI may comprise a plurality of displays having interactive fields, pull-down lists, and buttons operated by the user. In one example, the GUI presents multiple charts and tables according to specification by the user and receives commands from the user. It should be understood that the term graphical user interface may be used in the singular or in the plural to describe one or more graphical user interfaces and each of the displays of a particular graphical user interface. Further, the GUI contemplates any graphical user interface, such as a generic web browser, that processes information in system 10 and efficiently presents the information to the user. Property graph computer 50 can accept data from the user via the web browser (e.g., MICROSOFT INTERNET EXPLORER, GOOGLE CHROME, or MOZILLA FIREFOX) and return the appropriate HTML or eXtensible Markup Language (XML) responses.

Network 60 facilitates communications between run-time metadata module 20, event computers 30a-30n, event database 40, property graph computer 50, and any other components in system 10. This disclosure contemplates any suitable network 60 operable to facilitate communication between the components of system 10. Network 60 may include any interconnecting system capable of transmitting audio, video, signals, data, messages, or any combination of the preceding. Network 60 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components. This disclosure contemplates end networks having one or more of the described properties of network 60.

In an exemplary embodiment of operation, run-time metadata module 20 captures run-time metadata associated with an event. An event may be any type of action or calculation that generates, views, updates, alters, or deletes information associated with system 10. For example, event computer 30 may generate an event by starting an action to generate a report. As another example, event database 40 may create an event by performing calculations on data existing in event database 40. As an additional example, a third party source may generate data and transfer to a component in system 10.

In certain embodiments, run-time metadata module 20 implements a clickstream capture to identify events occurring on event computer 30. A clickstream capture is a recording of a user's mouse clicks and/or keyboard entries when initiating or using an application. The clicks or keyboard entries are then communicated to run-time metadata module 20. In certain embodiments, run-time metadata module 20 may determine whether certain clicks or keyboard entries constitute an event to capture run-time metadata.

In exemplary embodiments, run-time metadata is captured during the execution of an event. Run-time metadata module 20 may capture two types of run-time metadata: data provenance and data lineage. Data provenance documents the inputs, entities, systems, and processes that influence the data of interest. Data lineage, on the other hand, is a data's lifecycle and indicates where it was consumed to produce a result.

In certain embodiments, run-time metadata module 20 extracts design facts from the design-time metadata and stores it in memory 26. In certain instances, code harvesting may be used to extract design facts from the design-time metadata.

Run-time metadata module 20 formats the captured run-time metadata to a linked-list structure. A linked-list data structure is a data structure includes a group of nodes that together represent a sequence. Generally, each node is composed of a set of data and a link to the next node or nodes in the sequence. In certain embodiments, run-time metadata module 20 formats the run-time metadata to a double linked-list structure. In a doubled linked-list structure, each node points to the next node in sequence but also points to the previous node in the sequence.

Run-time metadata module 20 may generate a property graph using the captured run-time metadata. A property graph is a visual depiction of modeling relationships through nodes and connections. Each event, agent, artifact, and/or process is represented by a node, and each connection represents a relationship between two or more events, agents, artifacts, and/or processes. In certain instances, run-time metadata module 20 uses the pointers contained in the linked-list data structure to determine the connections between nodes. Each node may contain properties describing that event, agent, artifact, and/or process. In addition, each connection may contain a definition of the relationship between the nodes.

In certain instances, the property graph comprises a plurality of nodes. Specifically, the nodes may comprise a first node, a second node, and a third node. The first node may comprise an identification of the input data existing before the event (as specified by the data lineage). The second node may comprise an identification of the agent executing the event (as specified by the data provenance). The third node may comprise an identification of the resulting data of the event (as specified by the data lineage). In this example, the first node is graphically coupled to the second node, and the second node is graphically coupled to the third node. Furthermore, each node may contain a node descriptor identifying the action related to the event, the individual controlling the event, and the location of the event. Each connection between the nodes may contain a connection descriptor. For example, connection descriptor may identify an action associated with the event.

Run-time metadata module 20 may then display the property graph on property graph computer 50. The user of property graph computer 50 may interact with the property graph to further identify information in a particular node of connection. Examples of benefits that users can have by using the generated property graph includes: (1) attesting the accuracy of reports (for example, reports submitted to regulators and other government authorities); (2) addressing data quality issues; (3) validating test results; (4) assisting in signing off on user acceptance testing; and (5) analyzing data sources and usage to create an impact assessment for a proposed change.

A component of system 10 may include an interface, logic, memory, and other suitable elements. An interface receives input, sends output processes the input and/or output, and performs other suitable operations. An interface may comprise hardware and software. Logic performs the operation of the component. For example, logic executes instructions to generate output from input. Logic may include hardware, software and other logic. Logic may be encoded in one or more non-transitory, tangible media, such as a computer readable medium or any other suitable tangible medium, and may perform operations when executed by a computer. Certain logic, such as a processor, may manage the operation of a component. Examples of a processor include one or more computers, one or more microprocessors, one or more applications, and other logic.

Modifications, additions, or omissions may be made to system 10 without departing from the scope of the invention. For example, system 10 may include any number of run-time metadata modules 20, event computers 30, event databases 40, and property graph computers 50. Furthermore, the components of system 10 may be integrated or separated. For example, run-time metadata module 20 and event computer 30 may be incorporated into a single component.

Figure 2:
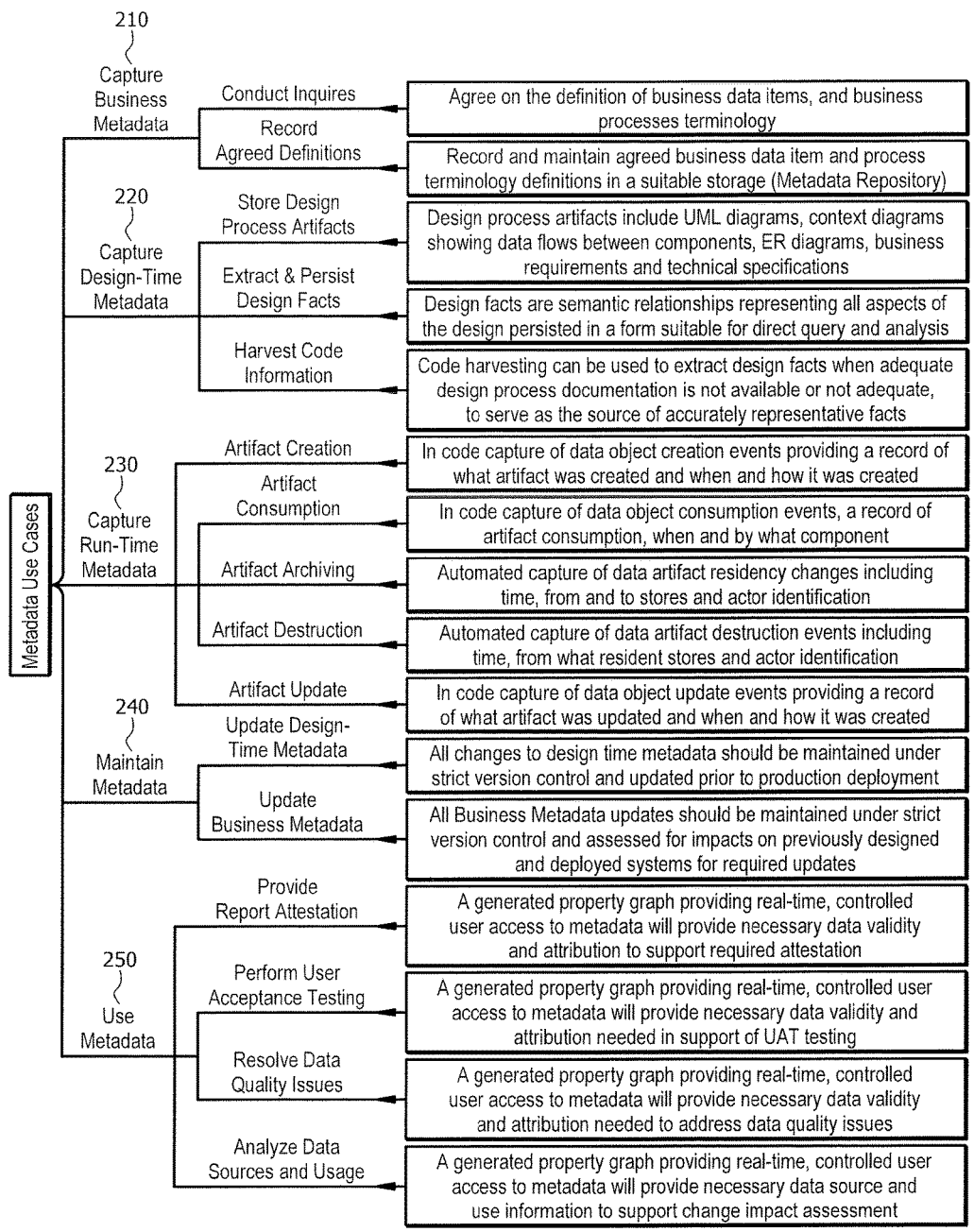
FIG. 2 is a chart describing metadata and the use cases for metadata.

FIG. 2 is a chart describing metadata and the use cases for metadata. The chart describes the business processes to implement capturing, maintaining, and using metadata in capture business metadata tree 210, capture design-time metadata tree 220, capture run-time metadata tree 320, maintain metadata tree 240, and use metadata tree 250.

Capture business metadata tree 210 describes identifying business data items and business process terminologies in order to provide consistent items, terms, and terminology when capturing metadata.

Capture design-time metadata tree 220 illustrates the process to extract design facts from stored design process artifacts. In certain embodiments, code harvesting may be used to extract the design facts.

Capture run-time metadata tree 230 illustrates the different types of run-time metadata captured during different events. In certain instances, data provenance may be generated by a code capture that runs during artifact creation events, artifact consumption events, artifact archiving events, artifact destruction events, and/or artifact update events. In artifact creation events, the code capture may capture what artifact was created, when the artifact was created, and how it was created. In artifact consumption events, the code capture may capture a record of the artifact consumption, when the artifact was consumed, and what component consumed the artifact. In the artifact archiving events, the code capture may capture the data artifact residency changes, such as where was the artifact moved from, where did the artifact move to, and the identification of the actor for the archiving. In the artifact updating event, the code capture may capture a record of what artifact was updated, when the artifact was updated, and how the artifact was updated. In an exemplary embodiment, run-time metadata module 20 captures the data provenance during the runtime of the event.

Maintain metadata tree 240 describes the control features required when design-time metadata or business metadata is updated.

Use metadata tree 250 provides examples of uses for the captured metadata. Using the generated property graph, the following benefits may be achieved: (1) attesting the accuracy of reports (for example, reports submitted to regulators and other government authorities); (2) addressing data quality issues; (3) validating test results; (4) assisting in signing off on user acceptance testing; and (5) analyzing data sources and usage to create an impact assessment for a proposed change.

Modifications, additions, or omissions may be made to the chart describing metadata and the use cases for metadata in FIG. 2 without departing from the scope of the invention.

Figure 3:
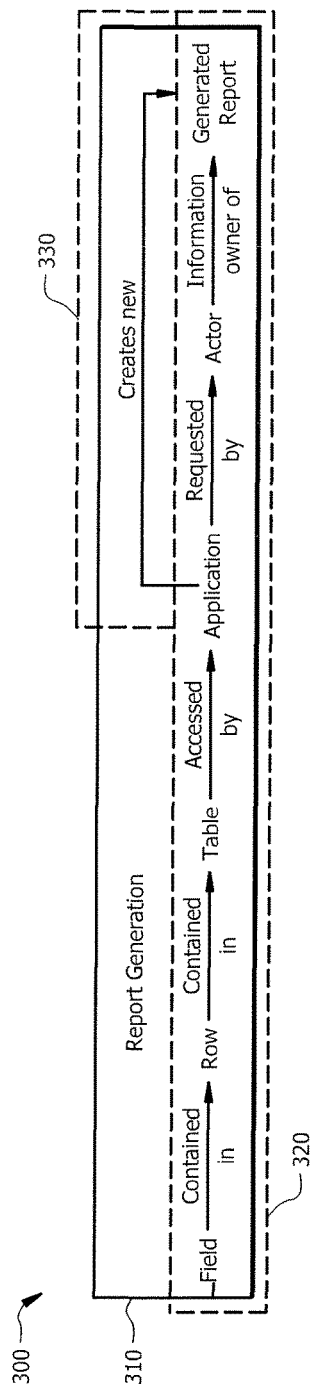
FIG. 3 is an abstracted example of captured run-time metadata.

FIG. 3 is an abstracted example of captured run-time metadata 300. In this example, captured run-time metadata 300 stems from an action click of "generate report" by an actor. In this example, report generation 310 is the event. During the run-time of report generation 310, run-time metadata module 20 may collect run-time metadata, including data provenance 320 and data lineage 330.

Data provenance 320 documents the inputs, entities, systems, processes, or any type of properties of attributes relating to report generation 310. In the illustrated embodiment, data provenance 320 identifies that a field is contained in a row, the row is contained in a table, the table is accessed by an application, the application is requested by an actor, and the actor is the information owner of the generated report.

Data lineage 330, on the other hand, identifies where a specified data comes from and how it has been transformed to its present state. In the illustrated embodiment, data lineage 330 contains information that identifies "Application" as creating "Generated Report (as represented by the link linking "Application" and "Generated Report" with the event action "Creates new"). Here, the generated report is the result of report generation 310 (i.e., the event). In addition, data lineage 330 identifies the input data existing before the event, which in the illustrated embodiment is the table (which also contains rows and fields).

Modifications, additions, or omissions may be made to captured run-time metadata 300 without departing from the scope of the invention.

Figure 4:
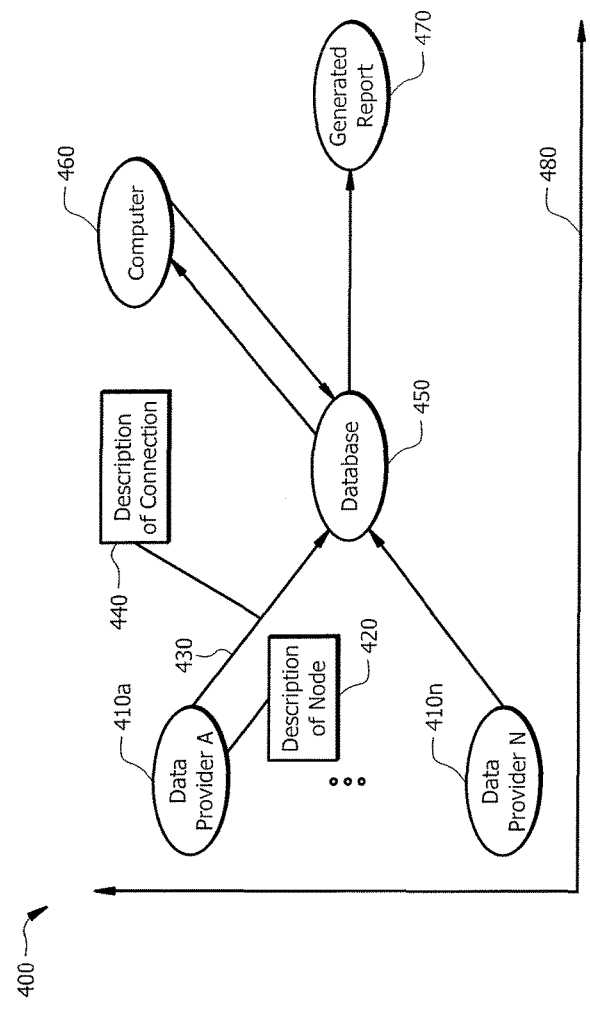
FIG. 4 is an abstracted representation of property graph.

FIG. 4 is an abstracted representation of property graph 400. Property graph 400 may be generated by run-time metadata module 2 using the captured and formatted run-time metadata. In the illustrated embodiment, elements 410a-410n, 450, 460, and 470 represent nodes in a property graph. Each node is a visual representation of an agent, artifact, or process associated with an event or the event itself. Furthermore, each node has an associated set of properties as depicted by node descriptor 420. As an example, a node may represent a data provider, a database, a calculator, an aggregator, a user, a regulator, or any other agent, artifact, process, or event. Each node is connected by one or more connections 430.

Property graph 400 may be a directed graph, wherein the set of nodes (elements 410a-410n, 450, 460, and 470) are connected by one or more connections 430. Moreover, the one or more connections 430 may have a direction associated with the connection (as represented by an arrow in connection 430).

Run-time metadata module 20 develops the nodes (such as elements 410a-410n, 450, 460, and 470) and connections 430 through the run-time metadata collected, specifically the provenance and data lineage collected. Using the run-time metadata, run-time metadata module 20 is able to identify and generate the nodes, and, using the sequences in the linked-list format, identify and generate the connections between the nodes.

In this embodiment, data provider 410 visually represents data providers 410 that provide data to database 450. As depicted in the illustration as 410a-410n, there may be multiple data providers communicating data into database 450. As an example, data provider 410 may provide transactions and positions records (such as information regarding the trades booked, existing outstanding loans, and extended loans). This information may be transferred to database 450.

Node descriptor 420 displays properties of the node. For instance, if the node is an agent, properties may include descriptions of the role of the agent, the actions taken, and the time the actions were taken.

The relationship (e.g., a data transfer) between data provider 410 and database 450 is recorded by connection 430. Connection 430 is a visual representation of the link between two nodes. Specifically, connection 430 may represent a dependency or causal dependencies between the two nodes. Using the arrow as a connection of the dependency, a viewer of property graph 400 can denote the source of the dependency and the effect of the dependency. For example, noting the direction of the arrowed line for connection 430, connection 430 displays the source of the causal dependency (data provider 410) and the effect of the dependency (database 450). Connection 430 can represent a myriad of dependencies, including a transfer of data, a causal dependency, a control relationship, a data derivation relationship, a triggering effect, a generation of data, a derivation, or any other relationship indicating a dependency between two or more nodes.

Similar to node descriptor 420, connection descriptor 440 displays properties of the connection. Examples of properties of the connection include time of the data transfer, the action produced by the connection, or any other information to describe the connection between the two nodes or the action present due to the connection between the two nodes.

Database node 450, computer node 460, and generated report 470 represent various types of agents, artifacts, processes, and/or events that a node may represent. Database node 450 visually represents a database that receives data from data providers 410a-410n. Computer node 460 visually represents a computer that interacts with the database. As an example, computer node 460 may represent a computer retrieving and modifying data stored in database 450. Generated report node 470 visually represents a generated report from information contained in a database (as represented by database node 450).

Axis 480 represents a customizable layout used to present the property graph in a manner that is easily viewable. In certain embodiments, property graph 400 may be arranged along a time line that represents the time of the events in order to show the progression of the data creation over time.

Modifications, additions, or omissions may be made to property graph 400 without departing from the scope of the invention.

Figure 5:
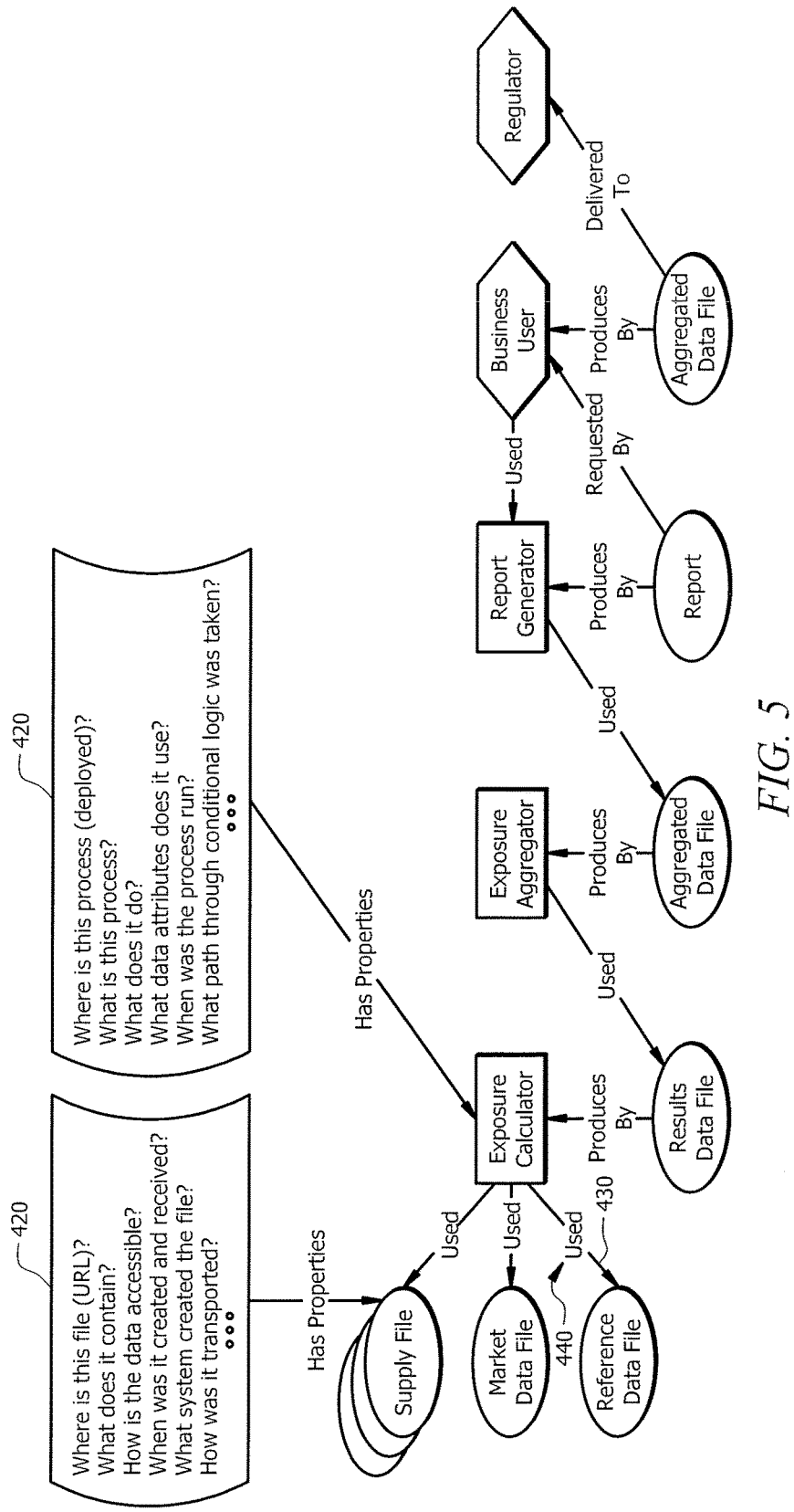
FIG. 5 is an example property graph.

FIG. 5 is an example property graph 500. In this illustration, the nodes are identified by boxes, hexagons, and ovals; connections 430 are identified by arrowed lines between the nodes. Illustrated in example node descriptor 420 are example questions that run-time metadata module 20 generates answers using the run-time metadata captured. In addition, connection descriptor 440 identifies the type of action used between the two nodes. Modifications, additions, or omissions may be made to property graph 500 without departing from the scope of the invention.

Figure 6:
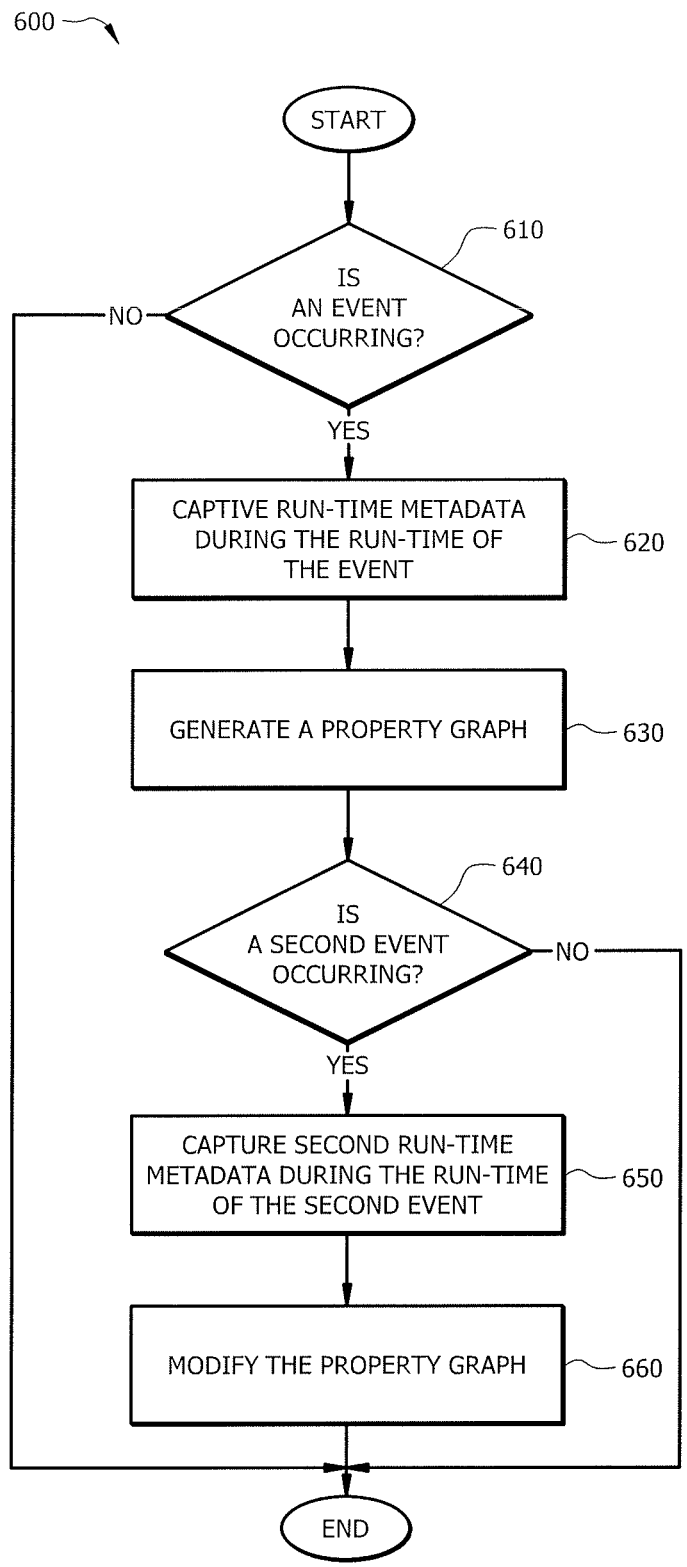
FIG. 6 illustrates an example method for capturing run-time metadata and generating a property graph.

FIG. 6 illustrates an example method 600 for capturing run-time metadata and generating a property graph. At step 610, run-time metadata module 20 determines if an event is occurring. If an event is not occurring, the method ends. If, however, an event is occurring, the method proceeds to step 620.

At step 620, run-time metadata module 20 captures the run-time metadata during the run-time of the event. Run-time metadata module 20 may capture two types of run-time metadata: data provenance and data lineage. Data provenance documents the inputs, entities, systems, and processes that influence the data of interest. In certain embodiments, the data provenance identifies an agent executing the event, an action related to the event, an individual controlling the event, and a location of the event. Data lineage, on the other hand, indicates a data's lifecycle and where the data was consumed to produce a result. In certain embodiments, the data lineage identifies an input data existing before the event and a resulting data of the event.

At step 630, run-time metadata module 20 generates property graph 400. Run-time metadata module 20 may then generate property graph 400 using the captured run-time metadata. Property graph 400 is a visual depiction of modeling relationships through nodes and connections. Each event, agent, artifact, and/or process is represented by a node, and each connection represents a relationship between two or more events, agents, artifacts, and/or processes. In certain instances, property graph 400 comprises a plurality of nodes. Specifically, the nodes may comprise a first node, a second node, and a third node. The first node may comprise an identification of the input data existing before the event (as specified by the data lineage). The second node may comprise an identification of the agent executing the event (as specified by the data provenance). The third node may comprise an identification of the resulting data of the event (as specified by the data lineage). In this example, the first node is graphically coupled to the second node, and the second node is graphically coupled to the third node. Furthermore, each node may contain node descriptor 420 identifying the action related to the event, the individual controlling the event, and the location of the event. Each connection between the nodes may contain connection descriptor 440. For example, connection descriptor 440 may identify an action associated with the event.

At step 640, run-time metadata module 20 determines if a second event is occurring. If a second event is not occurring, the method ends. If, however, a second event is occurring, the method proceeds to step 650.

Run-time metadata module 20 captures a second run-time metadata during the run-time of the second event at step 650. Similar to step 620, run-time metadata module 20 may capture two types of run-time metadata for the second event: a second data provenance and a second data lineage. The second data provenance may identify an agent executing the second event, an action related to the second event, an individual controlling the second event, and a location of the second event. The second data lineage may identify an input data existing before the second event and a result of the second event. In certain embodiments, the input data existing before the second event is the resulting data of the first event at step 620. If so, the second event is linked to the first event.

At step 660, run-time metadata module 20 modifies property graph 400. Property graph 400 is modified to include a fourth node comprising an identification of the second agent executing the second event. In addition, the fourth node is connected to the third node. In certain embodiments, the fourth node may contain node descriptor 420 identifying the action related to the second event, the individual controlling the second event, and the location of the second event. In addition, the connection between the third node and the fourth node may contain connection descriptor 440. For example, connection descriptor 440 may identify an action associated with the second event.

Modifications, additions, or omissions may be made to the method depicted in FIG. 6. The method may include more, fewer, or other steps. For example, run-time metadata module 20 may run a clickstream capture to identify that an event is occurring. As another example, run-time metadata module 20 may extract design facts from design-time metadata using code harvesting. While discussed as run-time metadata module 20 performing the steps, any suitable component of system 10 may perform one or more steps of the method.

Although the present invention has been described with several embodiments, a myriad of changes, variations, alterations, transformations, and modifications may be suggested to one skilled in the art, and it is intended that the present invention encompass such changes, variations, alterations, transformations, and modifications fall within the scope of the appended claims.

What is claimed is:

1. A system, comprising:
 a processor operable to:
  capture, during the run-time of a first event, first run-time metadata associated with the first event, the first run-time metadata comprising a data lineage and a data provenance, wherein:
   the data lineage identifies input data existing before the first event and resulting data of the first event; and
   the data provenance identifies an agent executing the first event;
  generate a property graph comprising a plurality of nodes, wherein the plurality of nodes comprises:
   a first node comprising an identification of the input data existing before the first event;
   a second node comprising an identification of the agent executing the first event, wherein the second node is coupled to the first node; and
   a third node comprising an identification of the resulting data of the first event, wherein the third node is coupled to the second node;
  capture, during the run-time of a second event, a second run-time metadata associated with a second event, the second run-time metadata comprising:
   a second data lineage indicating input data for the second event that is equivalent to the resulting data of the first event; and
   a second data provenance identifying a second agent executing the second event; and
  modify the property graph to further comprise a fourth node comprising an identification of the second agent executing the second event, wherein the fourth node is coupled to the third node.

2. The system of claim 1, wherein the data provenance further identifies an action related to the first event, an individual controlling the first event, and a location of the first event.

3. The system of claim 2, wherein the second node further comprises a node descriptor, the node descriptor identifying the action related to the first event, the individual controlling the first event, and the location of the first event.

4. The system of claim 1, wherein the processor is further operable to run a clickstream capture to identify the first event.

5. The system of claim 1, wherein the processor is further operable to extract design facts from design-time metadata using code harvesting.

6. The system of claim 1, wherein the connection between the first node and the second node comprises a connection descriptor, the connection descriptor identifying an action associated with the first event.

7. A method, comprising:
 capturing, during the run-time of a first event, first run-time metadata associated with the first event, the first run-time metadata comprising a data lineage and a data provenance, wherein:
  the data lineage identifies input data existing before the first event and resulting data of the first event; and
  the data provenance identifies an agent executing the first event;
 generating a property graph comprising a plurality of nodes, wherein the plurality of nodes comprises:
  a first node comprising an identification of the input data existing before the first event;
  a second node comprising an identification of the agent executing the first event, wherein the second node is coupled to the first node; and
  a third node comprising an identification of the resulting data of the first event, wherein the third node is coupled to the second node;
 capturing, during the run-time of a second event, a second run-time metadata associated with a second event, the second run-time metadata comprising:
  a second data lineage indicating an input data for the second event is equivalent to the resulting data of the first event; and
  a second data provenance identifying a second agent executing the second event; and modifying the property graph to further comprise a fourth node comprising an identification of the second agent executing the second event, wherein the fourth node is connected to the third node.

8. The method of claim 7, wherein the data provenance further identifies an action related to the first event, an individual controlling the first event, and a location of the first event.

9. The method of claim 8, wherein the second node further comprises a node descriptor, the node descriptor identifying the action related to the first event, the individual controlling the first event, and the location of the first event.

10. The method of claim 7, further comprising running a clickstream capture to identify the first event.

11. The method of claim 7, further comprising extracting design facts from design-time metadata using code harvesting.

12. The method of claim 7, wherein the connection between the first node and the second node comprises a connection descriptor, the connection descriptor identifying an action associated with the first event.

13. Non-transitory computer readable medium comprising logic, the logic, when executed by a processor, operable to:
capture, during the run-time of a first event, first run-time metadata associated with the first event, the first run-time metadata comprising a data lineage and a data provenance, wherein:
the data lineage identifies input data existing before the first event and resulting data of the first event; and
the data provenance identifies an agent executing the first event; and
generate a property graph comprising a plurality of nodes, wherein the plurality of nodes comprises:
a first node comprising an identification of the input data existing before the first event;
a second node comprising an identification of the agent executing the first event, wherein the second node is coupled to the first node; and a third node comprising an identification of the resulting data of the first event, wherein the third node is coupled to the second node;
capture, during the run-time of a second event, a second run-time metadata associated with a second event, the second run-time metadata comprising:
a second data lineage indicating an input data for the second event is equivalent to the resulting data of the first event; and
a second data provenance identifying a second agent executing the second event; and
modify the property graph to further comprise a fourth node comprising an identification of the second agent executing the second event, wherein the fourth node is connected to the third node.

14. The computer readable medium of claim 13, wherein the data provenance further identifies an action related to the first event, an individual controlling the first event, and a location of the first event.

15. The computer readable medium of claim 14, wherein the second node further comprises a node descriptor, the node descriptor identifying the action related to the first event, the individual controlling the first event, and the location of the first event.

16. The computer readable medium of claim 13, wherein the logic is further operable run a clickstream capture to identify the first event.

17. The computer readable medium of claim 13, wherein the logic is further operable extract design facts from design-time metadata using code harvesting.

* * * * *